Dec. 15, 1970    S. D. POOL ET AL    3,546,860
AUTOMATIC FORWARD TRAVEL CONTROL
Filed March 27, 1969    2 Sheets-Sheet 1
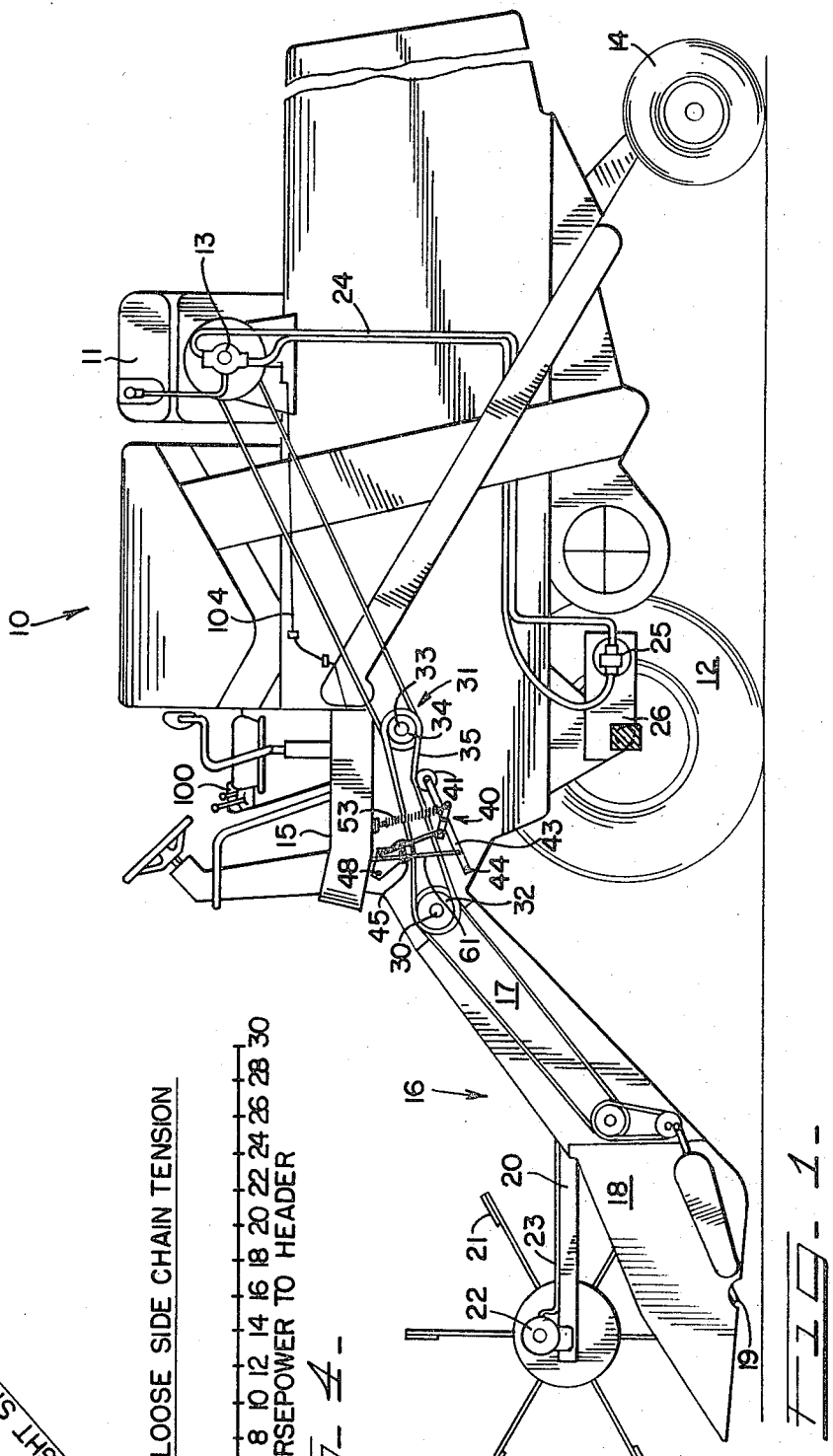
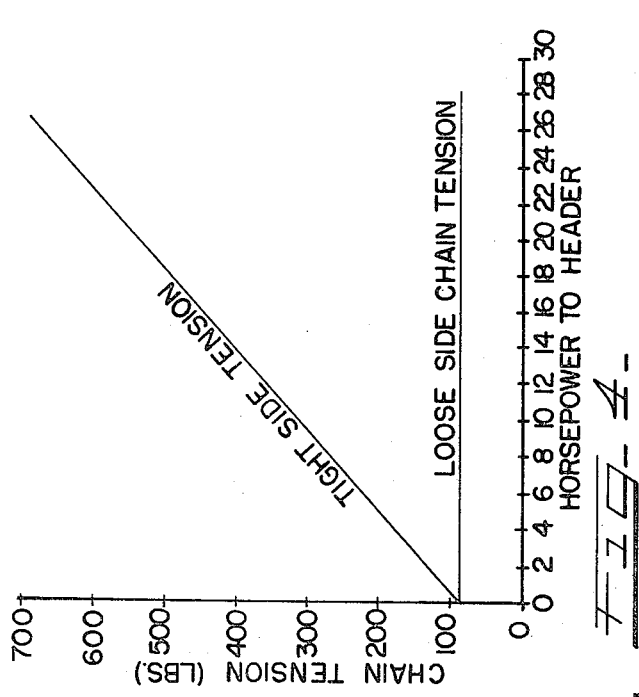
INVENTORS
STUART D. POOL
TOMMY A. MIDDLESWORTH
BY
ATT'Y.

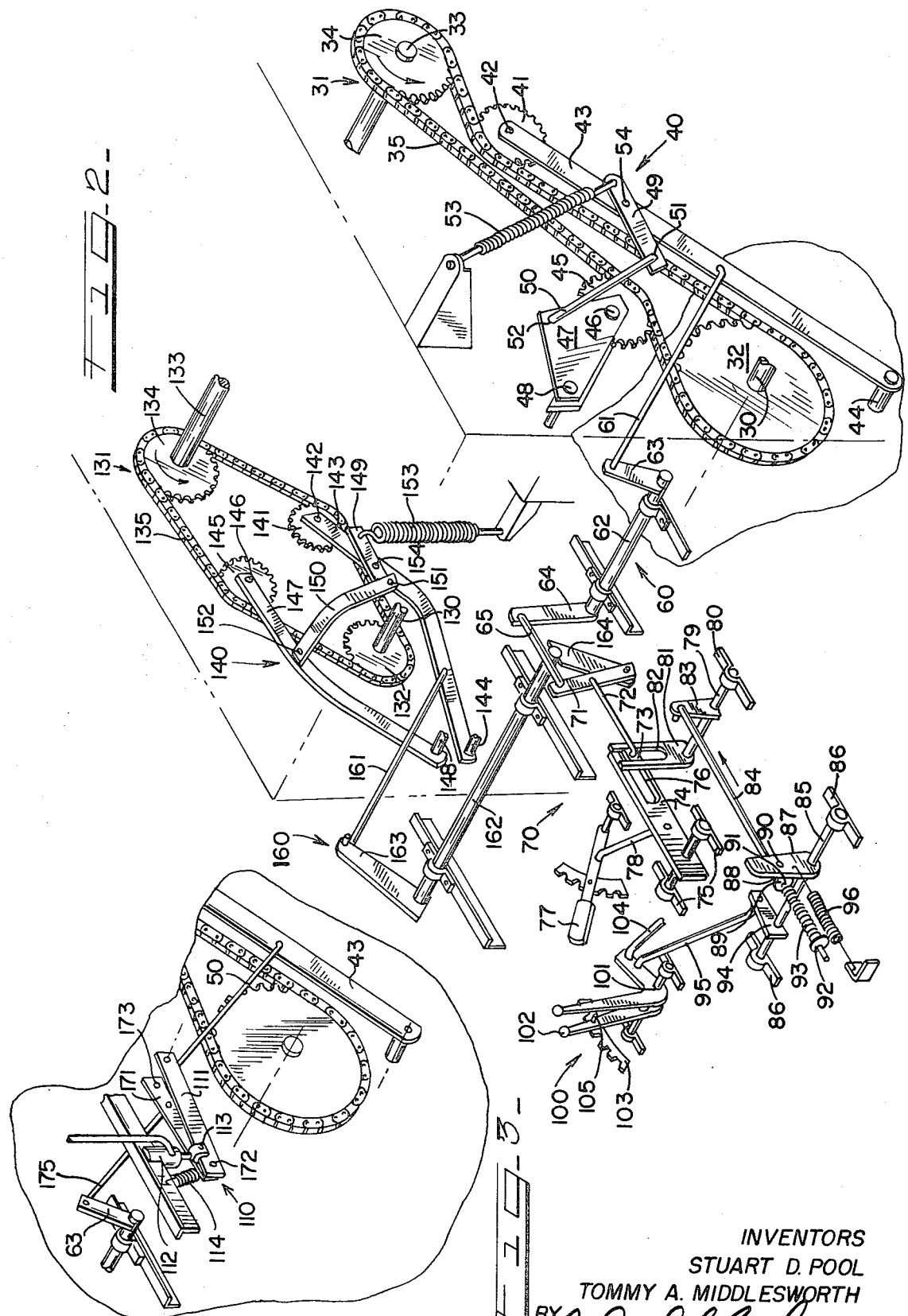

United States Patent Office 3,546,860
Patented Dec. 15, 1970

3,546,860
AUTOMATIC FORWARD TRAVEL CONTROL
Stuart D. Pool, Wheaton, and Tommy A. Middlesworth, Hinsdale, Ill., assignors to International Harvester Company, Chicago, Ill., a corporation of Delaware
Filed Mar. 27, 1969, Ser. No. 811,039
Int. Cl. A01d 41/02
U.S. Cl. 56—21  5 Claims

ABSTRACT OF THE DISCLOSURE

An automatic forward travel control apparatus for a harvesting machine that senses the work required to gather, cut, and feed material into the harvester and the work required to thresh the material and then regulates the ground speed in response to the algebraic sum of the measured works.

BACKGROUND OF THE INVENTION

This invention pertains to harvesting machines of the type that gathers, conveys and processes the crop while in the field and more particularly to means for controlling the forward travel of such a harvester.

The prior art discloses speed control devices for combines that sense the power requirements of one component to the combine and regulates the ground speed in response thereto. Devices such as this can be found in the patents to Pasturczak No. 2,639,569 of May 26, 1953 and Anderson No. 3,073,099 of Jan. 15, 1963. The major problem with the devices shown in the prior art is that they adjust the ground speed in accordance with the torque requirements at one station ignoring the torque requirements at other stations. If an unusually sparse spot in the field is encountered the ground speed will be sharply increased and if an unusually dense spot is encountered the ground speed will be sharply reduced. In other words the ground speed of the harvester depends solely upon the torque requirement at a particular point in the harvester and no consideration is given to the immediately preceding or future torque requirements. In the pending application to Pool et al. Ser. No. 677,443 filed on Oct. 23, 1967, now Pat. No. 3,481,122, there is disclosed an automatic forward speed control apparatus for a harvesting machine in which the torque requirements to feed the material into the harvester and the torque requirements to process the machine are sensed and then added algebraically. The forward speed of the harvester is then adjusted in an inverse ratio to this algebraic sum. The subject application is an improvement on the above referred to Pool et al. application and differs mainly in the idler system for the various drives from which the torque requirements are read.

SUMMARY

The general purpose of this invention is to provide an apparatus for automatically controlling the forward travel of a harvester which embraces all the advantages of the similarly employed prior art devices and possesses none of the aforedescribed disadvantages. To attain this the present invention contemplates a unique torque sensing system wherein the torque requirements of the harvesting machine are sensed at two or more locations. These readings are algebraically summed and the ground speed of the harvester is adjusted as an inverse function of this total. In the embodiment of applicants' device disclosed herein the torque is sensed at the feeder and platform drive and also at the threshing cylinder. If a greater than normal amount of crop is encountered an increased torque requirement will be sensed at the feeder and platform drive and a reduction in the harvester ground speed will be affected. The same material that caused the initial increase torque requirement at the feeder and platform drive would after a short time interval encounter the threshing cylinder. If this material likewise causes an increased torque requirement at the threshing cylinder and providing the torque requirements in the feeder and platform drive have not changed, a further reduction in the ground speed of the harvester will be effected. If, when, the initial material encounters the threshing cylinder, the torque requirements at the feeder and platform drive have been reduced then the ground speed would not be further reduced but rather it would be held at the first reduced level until the torque requirements at the threshing cylinder return to normal. Thus in applicants' device an algebraic sum of the torque requirements between multiple points is taken within the harvester and the ground speed is adjusted accordingly.

In one embodiment of applicants' device the torque requirements of a hydraulically driven reel are sensed and this requirement is summed algebraically with the torque requirements of the feeder and platform drive to thus obtain a more sensitive and accurate indication of the quantity of material being fed into the harvester. Since the reel is the first element of the harvester to encounter the crop about to be harvested, it is a particularly sensitive harbinger of the quantity of material that the harvester is about to encounter. The reel for many commercially available combines is driven by a hydraulic motor and thus the torque requirements are easily sensed since there is a direct relationship between the torque requirements and the fluid pressure in the lines supplying fluid to the hydraulic motor.

It has long been customary to sense a drive load by measuring the tension in the drive chain. This tension is conveniently determined by measuring the load against an idler on the tight or drive side of the chain and using that force and the vector angles to calculate the chain tension. In practice there have been many attempts to read-out drive loads from the movement of spring hung idlers on the tight and loose sides of the chain. These read-outs work well for light drives but have proved unstable on the heavier drives because rapid fluctuation in load caused fast swing of the spring hung idlers on the tight and loose sides of the chain. The chain would frequently develop waves and the tighteners would jump. When idler vibration periods corresponded, the tighteners would go out of phase and all tightener control of the chain would be lost resulting in jumped teeth and broken or thrown chains. In accordance with the subject invention each idler system includes a tight side idler and a loose side idler that the connected by linkage including a proportioning lever bar which causes them to move in unison thus rendering it impossible to lose all tightener control. The weight of the linkage, the force of a biasing spring, and the linkage vector relationship are such that the tension in the slack side of the chain remains practically constant regardless of the horsepower being transmitted by the drive. This even slack side tension and the trained tightener movement of the slack and tight side idlers provides smooth chain control with less chain damage and enables the idler systems to be used as a reliable indicator of the torque requirements of the drive.

BRIEF DESCRIPTION OF THE DRAWINGS

FIG. 1 is a side view of a combine harvester having applicants forward travel control apparatus mounted thereon;

FIG. 2 is a representation of the forward travel control system wherein the harvester is represented by broken lines;

FIG. 3 shows the novel portion of another embodiment of applicants' invention; and FIG. 4 is a graph of the tight and loose side chain tension at various horsepowers.

DESCRIPTION OF THE PREFERRED EMBODIMENT

Referring now to the drawings wherein like reference characters designate like or corresponding parts throughout the several views, there is shown in FIG. 1 a combine harvester designated 10 having an engine or power source 11 and traction means or drive wheels 12. Extending forwardly from the harvester 10 is a crop gathering means including a header 16 made up of a feeder portion 17 and a platform portion 18. The platform portion 18 includes a sickle 19, reel support arms 20 and a reel 21. The reel 21 is driven by a hydraulic motor designated 22 that is supplied with fluid through the hydraulic line 23. The harvester 10 includes a conventional operator's platform 15 and rear steerable wheels 14. The harvester 10 herein illustrated is equipped with a hydrostatic transmission including a variable ratio drive means 13 which supplies hydraulic fluid through the conduits 24 to the hydraulic motor 25 which is connected in driving relationship to the mechanical transmission 26. The hydrostatic transmission allows the operator to adjust the ground speed of the harvester infinitely within a range without changing the engine setting or shifting gears. This feature is not a part of the subject invention and thus a more detailed description is not deemed necessary.

As the harvester 10 progresses through a field the reel 21 folds the material back toward the sickle 19 which severs it from the ground. The severed crop is collected on the platform portion 18 where it is concentrated and moved to the feeder portion 17. The severed crop is fed up the feeder portion 17 and into the main portion of the harvester where it encounters the threshing, separating and cleaning components. As can be seen from FIG. 1 the reel 21 is the first element of the harvester to encounter the crop about to be harvested. The sickle 19, the feeding means on platform portion 18 and the feeder portion 17 next encounter the material that is about to be harvested. Thus the amount of work required to drive the reel, the sickle and the feeding means of the platform portion 18 and the feeder portion 17 will vary in direct proportion to the amount, kind, and condition of material about to be fed into the harvester. In some combines the drive for all of these elements are taken from a single shaft. In the combine illustrated in FIG. 1 the reel is driven by a hydraulic motor 22 and thus only the sickle 19, the feeding means for the platform portion 18 and the feeder portion 17 are taken from the shaft identified as the first crop feeding driver 30. The first drive means 31 for providing drive to the first crop feeding driver 30 includes a driven wheel or sprocket 32 carried by the first crop feeding driver 30, a drive shaft 33 having a drive wheel or sprocket 34 secured thereto and an endless member or chain 35 connecting sprockets 32 and 34.

An idler system identified as the first idler system 40 is provided for taking up slack in the endless member 35. The first idler system 40 includes a first tight side idler 41 pivotally connected at 42 to means such as an arm 43 which in turn is secured to the harvester chassis by a pivot 44. The idler system 40 also includes a first loose side idler 45 which is connected by a pivot 46 to means 47 which in turn is connected by a pivot 48 to the chassis of the harvester to thereby pivotally mount the first loose side idler 45 relative to the harvester. The means 43 and 47 are interconnected to thus establish a relationship between movement of the tight and loose side idlers 41 and 45 respectively. The interconnection between means 43 and 47 include a first proportioning lever bar 49 pivotally connected by pivot 54 to the arm 43. A first connecting linkage 50 is pivotally connected at one end 51 to the proportioning lever bar 49 and at its other end 52 to the means 47. A spring means 53 is connected at the other end of the first proportioning lever bar 49 and is anchored to the chassis of the harvester such that it biases the idlers 41 and 45 in opposite directions.

The torque requirements of the first crop feeding driver 30 are reflected in the first idler system 40 and are monitored by the first torque sensing means 60. The first torque sensing means 60 includes a pivot shaft 62 (see FIG. 2) having lever arms 63 and 64 and a first link 61 pivotally connected at one end to the lever arm 63 and at its other end to the means 43 pivotally mounting the first tight side idler. When the drive load on the first crop feeding driver 30 is low the first tight side idler 41 is positioned to tighten the drive chain 35 and the first loose side idler 45 is riding on a relatively straight chain. When the drive load of the first crop feeding driver 30 is high the tight side of the chain 35 straightens thus displacing the first tight side idler 41 and the first loose side idler 45 moves to take up the chain slack. The first proportioning lever bar 49 and the first connecting linkage 50 insures that the first tight side idler 41 and the first loose side idler 45 move in unison. The weight of the entire first idler system 40, the force of the biasing spring 53 and the linkage vector relationships are such that the tension in the slack side of the chain 35 remains practically constant regardless of the horsepower being transmitted by the drive. This relationship is shown graphically in FIG. 4 wherein the chain tension is plotted on the vertical axis versus the transmitted horsepower on the horizontal axis. In FIG. 4 the inclined line illustrates how the tight side chain tension increases in direct relationship to the transmitted horsepower. The horizontal line shown in FIG. 4 illustrates how the loose side chain tension remains relatively constant regardless of the transmitted horsepower. This feature of maintaining a constant pressure on the loose side of the chain is designed into the geometry of the idler system and is a dimensional function of the various pivot radii linkage lengths and idler diameters. The design must be such that the loose side idler exerts a slightly greater force on the chain when it is bowed than when it is straight, because the tensions in the chain has an inverse relationship to the sine of the angle between the bowed and straight position of the chain. In other words as the bow in the chain increases the loose side idler must exert an increasing force to maintain a constant tension in the chain. An adjustment can be provided in the idler system by constructing the first connecting linkage 50 such that its length can be adjusted.

The amount of torque transmitted by the first crop feeding driver 30 is thus reflected in the means 43 that pivotally mounts the first tight side idler 41 and is sensed by the first torque sensing means 60 through the first link 61.

As can be best seen in FIG. 2 the harvester includes a second crop processing driver 130. This driver provides a rotary motion to the threshing cylinder (not shown). The second processing driver 130 is driven by a second drive means 131 which includes a second driven wheel 132, a second drive shaft 133, a second drive wheel 134, and a second endless member 135. It should be noted that although it is not necessary, the first drive shaft 33 and the second drive shaft 133 could be the same element. The second drive wheel 134 rotates in a counterclockwise direction as seen in FIG. 2 and thus the lower run of the endless chain 135 would be the tight side and the upper run would be the loose side.

A second idler system 140 is provided for the second crop processing drive means 131. The second idler system 140 includes a second tight side idler 141 pivotally connected at 142 to means such as an arm 143 which in turn is connected by a pivot 144 to the harvester chassis. A second loose side idler 145 is connected by a pivot 146 to means such as an arm 147 which in turn is connected by a pivot 148 to the harvester chassis. A second proportioning lever bar 149 is connected at its midsection by a pivot 154 to the arm 143. A second connecting linkage 150 is pivotaly connected at 151 to one end of the second proportioning lever bar 149 and at its other end by a pivot 152 to the arm 147. A spring means 153 is anchored at one end to the harvester chassis and connected at its other end to the other end of the second proportioning lever 149. The second idler system 140 functions in the same way as does the first idler system 40 however it is designed so that the idlers 141 and 145 engage the inner side of the chain rather than the outer side as in the first idler system. The second idler system 140 like the first idler system is designed so that the tension on the loose side idler 145 remains relatively constant regardless of the tension on the tight side idler 141.

A second torque sensing means 160 is provided to monitor the amount of torque transmitted by the second crop processing drive 130. The second torque sensing means includes a pivot shaft 162 having lever arms 163 and 164 and a second link 161 pivotally connected at one end to the lever arm 163 and at its other end to the means 143 pivotally mounting the second tight side idler.

The integrating means 70 functions to algebraically sum the torque requirements of the first crop feeding drive 30 as sensed by the first torque sensing means 60 and the torque requirements of the second crop processing driver 130 as sensed by the second torque sensing means 160. The integrating means 70 includes an integrating link 71 that is pivotally connected to the lever arm 64 of the first torque sensing means 60 by a bar 65. The other end of the integrating link 71 is pivotally connected to the lever arm 164 of the second torque sensing means 160. A rod 72 is pivotally connected at one end to the mid-portion of the integrating link 71 and is pivotally connected at its other end to a slide block 73. An arm 74, arranged to oscillate about a pivotable mount 75, has a slot 76 formed in its free end. The slot 76 is dimensioned to slidably receive the slide block 73. A sensitivity control lever identified as 77 is connected through a rod 78 to the arm 74. The sensitivity control lever 77 is located such that the operator can set it in a selected position and thus adjust the attitude of the arm 74 and the slot 76 formed therein. The operator can by proper adjustment of lever 77 select the summed gathering feeding and threshing load at which he wishes the machine to operate. A shaft 79 is supported in a pivotable mount 80 and has a lever arm 81 extending radially therefrom. The lever arm 81 has a slot 82 formed therein dimensioned to slidably receive slide block 73 It should be noted that the slot 82 formed in arm 81 and the slot 76 formed in arm 74 extend approximately normal to each other. A second radially extending arm 83 extends outwardly from the shaft 79 and has one end of a rod 84 pivotally mounted thereto. A shaft 85 journalled in pivot mounts 86 has a lever arm 87 extending radially therefrom. A biasing spring 96 anchored at one end and connected to arm 87 at the other end tends to rotate shaft 85 in a counter-clockwise direction as seen in FIG. 2. A tab 88 having an offset portion 89 is secured to the lever arm 87 by a pivot 90. The offset portion 89 has an aperture 91 formed therein of a size to freely receive the rod 84. The rod 84 extends through the aperture 91 and has a shoulder 92 secured to its end portion. A coil compression spring 93 surrounds the rod 84 and bears against the shoulder 92 and the offset portion 89. A second lever arm 94 extends radially from the shaft 85 and has a rod 95 pivotally connected to its free end. The other end of rod 95 is pivotally connected to the control lever 101 of the control means 100.

The control means 100 are located on the operator's platform 15 so that the operator has easy access thereto. The control means includes a control lever 101 illustrated in the form of a pivotally mounted bellcrank. One leg of the bellcrank control lever 101 functions as a handle that can be grasped by the operator and manipulated to manually cotnrol the forward speed of the harvester. A control rod or cable 104 is connected to the other leg of the bellcrank control lever and extends to the variable ratio drive means 13. Pivotable movement of the control lever 101 is transmitted through the control rod or cable 104 to the wobble plate of the variable ratio drive means 13 to thus control the amount of fluid conveyed through the conduits 24 to the hydraulic motor 25. A speed limit control lever 102 is pivotally mounted adjacent the control lever 101 and its position can be fixed relative to a notched quadrant 103. A pin 105 protrudes from the speed limit control lever 102 such that it functions as an obstruction to pivotable movement of the control lever 101. Thus by setting the speed limit control lever 102 at a selected position a maximum speed for the harvester can be selected. As previously stated the rod 95 of the integrating means 70 is pivotally connected at one end to the lever arm 94 and at its other end to the control lever 101 of the control means. Through this rod 95 the output of the integrating means 70 is transmitted to the control lever 101 and thus the ground speed of the harvester is influenced by the integrating means 70. Referring now to FIG. 2, an example of the operation will be reviewed. If as the harvester 10 proceeds through a field it encounters an area of increasing crop processing difficulty, the power requirements to sever the crop, gather it on the platform 18, and convey it up the feeder 17 will likewise increase. Thus the power requirements of the first crop feeding driver 30 will increase and the tight side of the chain 35 will tend to straighten. This causes the tight side idler 41 to be pivoted downwardly about the pivot 44. The first link 61 exerts a downward pull on the arm 63 and this movement is conveyed through the pivot shaft 62 to the arm 64. As seen in FIG. 2 the pivot shaft 62 will be pivoted in a clockwise direction and this movement would be transmitted by the bar 65 to the integrating link 71, which would be pulled rearwardly. The rearward movement of the integrating link 71 is transmitted to the slide block 73 through the rod 72. The sensitivity control lever 77 has been set in a pre-selected position and thus the slide block 73 slides rearwardly along the slot 76. The movement of the slide block 73 also causes a relative movement between the slide block 73 and the arm 81. This movement will cause the arm 81 to be moved rearwardly and thus pivot the shaft 79 in the clockwise direction. This clockwise rotation of shaft 79 will be transmitted through the arm 83 and rod 84 to pivot shaft 85. This clockwise rotation of pivot shaft 85 will be transmitted through the lever arm 94 and rod 95 to the control lever 101 of the control means 100. The control lever 101 will thus be caused to pivot in a clockwise direction which is the direction that will result in a reduced ground speed for the harvester. Thus the increased processing difficulty encountered by the harvester will automatically cause the ground speed of the harvester to be slowed.

It should be noted that in the above example as the increased torque requirement of the first crop feeding driver 30 was transmitted to one end portion of the integrating link 71 the integrating link 71 pivoted about its other end. Since the rod 72 is connected to the mid-portion of the integrating link a movement of reduced magnitude was passed on to rod 72. If, however, the second crop processing driver 130 had also encountered an increased load, this information would have been transmitted to the other end of the integrating link 71. When both ends of integrating link 71 are moved in the same direction the full magnitude of the increased power requirements are transmitted to rod 72, and the speed change is greater. Thus the integrating link 71 functions to sum algebraically the torque from the first crop feeding drive 30 and the second crop processing drive 130 and passes on this integrated information to the control means 100. This stabilizes somewhat the variation in ground speed of the harvester.

Referring now to FIG. 3 wherein another embodiment is illustrated. The difference in this embodiment and that shown in FIG. 2 is confined to the structural elements connecting the means 43 for pivotally mounting the first tight side idler and the arm 63 of the first torque sensing means 60. In some combines crop feeding devices such as the reel 21 are powered hydraulically. This has the advantages of providing a readily varied reel speed control. The power requirements to a hydraulically powered reel are directly proportional to the pressure in the conduits supplying hydraulic fluid to the reel's hydraulic motor. Thus the power requirements of a hydraulically driven reel can be easily monitored by sensing the pressure in the pressure line supplying fluid to the hydraulic motor. The reel of a harvester is the first element of the machine to actually encounter the material about to be severed and fed to the harvester and will thus give the earliest warning of a change in the yield, condition, and amount of material to be fed to the harvester. The torque sensing means 110 for monitoring the torque requirements of the reel includes a one-way hydraulic cylinder 112 that is dead-ended onto the hydraulic reel drive pressure line and has its piston stem connected by a pivot 113 to a pivotally mounted link 111. The one-way cylinder acts against a spring 114 which yields progressively to increased pressure. Thus the pivotally mounted link 111 will pivot in response to a change in pressure in the reel pressure line. A crop-feed integrating link 171 is connected at one end by a pivot 172 to the free end of the pivotally mounted link 111. The crop-feed integrating link 171 is connected at its other end by a pivot 173 to the first connecting linkage 50 of the first idler system 40. A crop-feed link 175 is connected to the mid-portion of the crop-feed integrating link 171 at its mid-section and the other end of the crop-feed link 175 is connected to the arm 63 of the first torque sensing means 60. From this arrangement it is seen that the torque requirements of the first crop feeding driver 50 are summed algebraically with the torque requirements of the hydraulically driven reel and this total is then summed algebraically with the torque requirements of the second processing driver 130.

What is claimed is:

1. A harvesting having a power source, traction means for advancing said harvester over a field, variable ratio drive means connecting said traction means to said power source;
   a first driver carried by the harvester;
   first drive means connecting said first driver to said power source, said first drive means including a driven wheel carried by said first driver, a drive shaft, a drive wheel aligned with said driven wheel and carried by said drive shaft, an endless member connecting said drive and driven wheels and a first idler system for maintaining the endless member taut;
   said first idler system comprising a first tight side idler, means pivotally mounting said first tight side idler, a first loose side idler, means pivotally mounting said first loose side idler, a first proportioning lever bar pivotally mounted on said means pivotally mounting the tight side idler, a first connecting linkage pivotally connected at one end to said means pivotally mounting said first loose side idler and at its other end to one end of said first proportioning lever bar, means connected to the other end of said first proportioning lever bar tending to pivot it about its pivotal mounting to exert a force on said first idlers in opposite directions;
   first torque sensing means for monitoring the torque requirements of said first driver;
   a second crop processing driver carried by said harvester;
   second drive means connecting the said second driver to said power source, said second drive means including a second driven wheel carried by said second driver, a second drive shaft, a second drive wheel aligned with said second driven wheel and carried by said second drive shaft, a second endless member connecting said second drive and driven wheels and a second idler system for maintaining the second endless member taut;
   said second idler system comprising a second tight side idler, means pivotally mounting said second side tight idler, a second loose side idler, means pivotally mounting said second loose side idler, a second proportioning lever bar pivotally mounted to said means pivotally mounting the second tight side idler, a second connecting linkage pivotally connected at one end of said second means pivotally mounting the second loose side idler and at its other end to one end of said second proportioning lever bar, and means connected to the other end of said second proportioning lever bar tending to pivot it about its pivotal mounting to exert a force on said second idlers in opposite directions;
   second torque sensing means for monitoring the torque requirements of said second driver;
   integrating means for algebraically summing said torque requirements;
   control means connecting said integrating means and said variable ratio drive means such that the ground speed of the harvester will be inversely effected by a change in the algebraic sum of said torque requirements.

2. A harvester having a power source, traction means for advancing said harvester over a field, variable ratio drive means connecting said traction means to said power source;
   a crop processing driver carried by the harvester;
   drive means connecting said crop processing driver to said power source, said drive means including a driven wheel carried by said crop processing driver, a drive shaft, a drive wheel aligned with said driven wheel and carried by said drive shaft, an endless drive member connecting said drive and driven wheels and an idler system for maintaining the endless member taut;
   said idler system comprising, a tight side idler, means pivotally mounting said tight side idler, a loose side idler, means pivotally mounting said loose side idler, a proportioning lever bar pivotally mounted on said means pivotally mounting the tight side idler, a connecting linkage pivotally connected at one end to said means pivotally mounting the loose side idler and at its other end to one end of said proportioning lever bar, and means connected to the other end of said proportioning lever bar tending to pivot it about its pivotable mounting to exert a force on said idlers in opposite directions;
   a torque sensing means for monitoring the torque requirements of said driver;
   control means connecting said torque sensing means and said variable ratio drive means such that the ground speed of the harvester will be inversely effected by a change in said torque requirements.

3. A harvester having a power source, traction means for advancing said harvester over a field, variable ratio drive means connecting said traction means to said power source, said variable ratio drive means including controhl means;
   a crop feeding driver carried by the harvester;
   drive means connecting said crop feeding driver to said power source, said drive means including a driven wheel carried by said crop feeding driver, a drive shaft, a drive wheel aligned with said driven wheel and carried by said drive shaft, an endless drive member connecting said drive and driven wheels and an idler system for maintaining the endless member taut;
   said idler system comprising, a tight side idler, means pivotally mounting said tight side idler, a loose side idler, means pivotally mounting said loose side idler, a proportioning lever bar mounted on said means pivotally mounting the tight side idler, a connecting linkage pivotally connected at one end to said means pivotally mounting the loose side idler and at its other end to one end of said proportioning lever bar, and means connected to the other end of said proportioning lever bar tending to pivot it about its pivotable mounting to exert a force on said idlers in opposite directions;

a hydraulically powered crop feeding device including a hydraulic pressure line;

torque sensing means for monitoring the torque requirements of said crop feeding driver and said hydraulically powered crop feeding device, comprising a pivotally mounted link, a hydraulic cylinder mounted adjacent said pivotally mounted link and connected thereto such that said link is pivoted in response to expansion and contraction of said hydraulic cylinder, a hydraulic line connecting said hydraulic cylinder to said hydraulic pressure line, a crop feed integrating link pivotally connected at one end to said pivotally mounted link and at its other end to said means pivotally mounting said tight side idler, and at its midsection to the control means for said variable ratio drive means such that the ground speed of the harvester will be inversely effected by a change in said torque requirements.

4. The invention as set forth in claim 3 wherein said harvester further includes a crop processing driver carried by the harvester;

a second drive means connecting said crop processing driver to said power source;

second torque sensing means for monitoring the torque requirements of said second drive means;

an integrating link connected at one end to said second torque sensing means and at its other end to the midsection of said crop feed integrating link and at its own midsection to the control means for said variable ratio drive means such that the ground speed of the harvester will be inversely effected by a change in the algebraic sum of said torque requirements.

5. The invention as set forth in claim 4 wherein said second drive means includes a second driven wheel carried by said crop processing driver, a second drive shaft, a second drive wheel aligned with said second driven wheel and carried by said second drive shaft, a second endless drive member connecting said second drive and driven wheels and a second idler system for maintaining the second endless member taut;

said second idler system comprising, a second tight side idler, means pivotally mounting said second tight side idler, a second loose side idler, means pivotally mounting said second loose side idler, a second proportioning lever bar pivotally mounted on said means pivotally mounting said second tight side idler, a second loose side idler, means pivotally mounting said second loose side idler, a second proportioning lever bar pivotally mounted on said means pivotally mounting said second tight side idler, a second connecting linkage pivotally connected at one end to said means pivotally mounting said second loose idler and at its other end to one end of said second proportioning lever bar, and means connected to the other end of said second proportioning lever bar tending to pivot it about its pivotable mounting to exert a force on said second idlers in opposite directions.

References Cited

UNITED STATES PATENTS

| | | | |
|---|---|---|---|
| 2,639,569 | 5/1953 | Pasturczak | 56—20 |
| 3,073,099 | 1/1963 | Andersen | 56—20 |
| 3,481,122 | 2/1969 | Pool et al. | 56—21 |

LOUIS G. MANCENE, Primary Examiner

J. A. OLIFF, Assistant Examiner